United States Patent [19]
Carlton et al.

[11] Patent Number: 4,867,449
[45] Date of Patent: Sep. 19, 1989

[54] ELECTRICALLY OPERATED LINE MONITOR FOR TENNIS

[75] Inventors: William C. Carlton, M'Xlokk; Margaret P. England, San Gwann, both of Malta

[73] Assignee: Carlton Associates, London, England

[21] Appl. No.: 142,159

[22] Filed: Jan. 11, 1988

Related U.S. Application Data

[63] Continuation-in-part of Ser. No. 403,962, Aug. 2, 1982, Pat. No. 4,718,669, which is a continuation-in-part of Ser. No. 463,695, Jun. 14, 1982, abandoned, which is a continuation-in-part of Ser. No. 92,904, Nov. 9, 1979, abandoned.

[30] Foreign Application Priority Data

| Nov. 10, 1978 | [GB] | United Kingdom | 44026/78 |
| Dec. 29, 1978 | [GB] | United Kingdom | 50208/78 |
| Jul. 10, 1979 | [GB] | United Kingdom | 29346/78 |

[51] Int. Cl.[4] ............................................. A63B 61/00
[52] U.S. Cl. ................................. 273/29 R; 340/323 R
[58] Field of Search ............... 273/29 R, 29 A, 31; 340/323 R

[56] References Cited

U.S. PATENT DOCUMENTS

| 3,370,284 | 2/1968 | Bango | 340/555 |
| 3,415,517 | 12/1968 | Kirst | 273/29 R |
| 3,810,148 | 5/1974 | Karsten | 273/29 R |
| 3,854,719 | 12/1974 | Supran | 273/29 R |
| 4,004,805 | 1/1977 | Chen | 273/29 R |
| 4,375,289 | 5/1983 | Schmall et al. | 273/29 R |
| 4,422,647 | 12/1983 | Wilson et al. | 273/29 R |
| 4,432,058 | 2/1984 | Supran | 273/29 R |
| 4,528,548 | 7/1985 | Oberan | 273/29 R |

FOREIGN PATENT DOCUMENTS

| 1370332 | 10/1974 | United Kingdom | 273/29 R |

*Primary Examiner*—Leo P. Picard
*Assistant Examiner*—Jessica J. Harrison

[57] ABSTRACT

An electrically operated line monitor for tennis wherein different characteristics are used for rays which are projected from the same first position to the same second position. In one embodiment of the invention, to monitor the center line (104) on a tennis court, a master ray (111) is projected down the center line (104) and has different characteristics to two other rays (114, 117) projected on either side of the master ray (111) and over the service courts (108, 107) adjacent to the center line (104). In another form of the invention, a ray (128) which can be a master ray is projected just inside a critical line from a first position to a second position, a diverging ray (133) having the same characteristics as the master ray is projected from the second position to the first position and another diverging ray (135) having different characteristics to the two other rays is projected from the first position to the second position; this prevents interference due to careless setting-up.

13 Claims, 4 Drawing Sheets

ELECTRICALLY OPERATED LINE MONITOR FOR TENNIS

BACKGROUND

This application is a continuation-in-part of U.S. patent application Ser. No. 06/403,962, filed Aug. 2, 1982, now U.S. Pat. No. 4,718,669, which is a continuation-in-part of U.S. patent application Ser. No. 06/463,695, now abandoned, filed June 14, 1982, which is a continuation-in-part of U.S. patent application Ser. No. 092,904, now abandoned, filed Nov. 9, 1979.

This invention relates to an electrically operated line monitor for tennis which incorporates at least one transmitter in a first position. The transmitter projects at least one ray to at least one receiver in a second position for registering the ray. The monitor also comprises a signalling means.

It is a feature of the game of tennis that it should be known whether the ball strikes the ground inside or outside certain parts of the court; these certain parts are limited by lines, the outside edges of which are the most important and are hereinafter called critical lines. In important games, linesmen are positioned so that they can assess where the ball strikes the ground. This duty requires a high degree of concentration on the part of the linesmen whose decisions are frequently questioned, sometimes with consequent upset to the orderly progress of the game; the latter is particularly the case when the ball falls near a critical line.

An electrically operated device for determining the position of the bounce of a ball in tennis and other games is known from British Specifications 1,370,331-2-3. This device incorporates a ball having an electrically conducting surface, which, on striking a surface on a court adapted to convey an electric current, causes a signal to indicate the position of the bounce of the ball. The device also incorporates a single ray to detect if a player's foot crosses a line (British Specification No. 1,370,332).

Rays for use in safety devices on machines and for burglar alarms and for many other uses in detection devices are well known. It is also well known to limit a ray by modulation and shutters and optical means so that an effective part of a ray will register on a specific receiver. Typical object-detecting devices are described in British Specification Nos. 1,425,896 and 989,041.

The ball with its electrically conducting surface and the court with its special surface proposed in British Specifications 1,370,131-2-3 constitute requirements which could affect the game of tennis as it now stands. The ray proposed in British Specification 1,370,332 for detecting whether a player's foot crosses the base line, indicates that the use of rays was considered in connection with tennis, but a ray such as that proposed would need to reach higher than the height of a tennis ball in contact with the ground and moreover, a single ray sited as described in British Specification 1,370,332 would, even if its operative part were such as to be interrupted by a tennis ball give the same signal for a ball which had bounced 'in' as for a ball which was about to bounce 'out'.

A tennis ball can travel along approximately the same path as the rays which are to be interrupted as distinct from a path approximately at a right angle to the rays. For instance, if the rays are to monitor the center line on a tennis court, the ball is travelling in approximately the same path as the rays monitoring the center line whereas if the rays are to monitor the service line the ball is travelling at approximately a right angle to the service line.

Therefore, it is an object of the present invention to provide a device which will correctly assess, within very close limits, whether the ball strikes the ground inside or outside the correct area of the court when the strike is near a critical line.

Advantages of the invention include the fact that no special ball or electrically conducting surface is required, and that the device can be used on any first class court and moved from one tournament to another. Additionally, by siting rays in a novel manner, proven techniques can be used to achieve a result more consistently reliable than hitherto

SUMMARY

An electronically operated line monitor for tennis which uses one or more rays substantially smaller in effective cross-section than a tennis ball to monitor areas of a tennis court adjacent critical lines thereof. The rays pass over the playing surface of the court at a height lower than the height of a tennis ball. In various embodiments, a first ray which actuates a 'good' signal on substantially complete interruption of its effective part, travels over an area of the court in which a ball would strike if it were 'good'. The said first ray travels essentially parallel to and in practice slightly distanced from a perpendicular from said critical line and is so positioned that a ball in play across the said 'good' area towards the said critical line and which just completely interrupts the reception of the effective part of the said first ray must afterwards strike the said critical line. The said first ray is the nearest 'good' ray to the perpendicular from the said critical line.

Further embodiments employ additional rays (referred to as further rays) and positioned slightly on either the inside or the outside of a perpendicular to the critical line depending on whether 'good' or 'fault' balls are to be monitored. The further rays are spaced progressively further from the perpendicular so that a ball in play striking the ground in a monitored area will interrupt the passage of at least one of the rays, thereby actuating a signal. In one of these embodiments, the first ray functions as a master ray to monitor the area just inside the perpendicular from the critical line. If the master ray is interrupted by the passage of a good ball which subsequently skids into the fault area, the master ray prevents any subsequent signal.

One embodiment of the invention employs a plurality of further rays, each ray having the effective cross-section as described above and each successive ray being distanced progressively farther from the critical line and at substantially the same height above the playing surface of the court. The distance between any of the further rays is such that a ball striking the ground in the area monitored by the device will interrupt one of the rays, thereby actuating the signal. The cross section of a ray may conveniently be limited by passing the ray through one or more small apertures but alternative methods of obtaining a similar result may be used. To reduce the possibility of interference the axes of rays travelling in the same direction are spaced no less than the diameter of a tennis ball apart at their receivers and preferably adjacent rays travel in opposite directions.

In another embodiment of the invention a transmitter in a first position projects a diverging ray which registers on a plurality of receivers in a second position, the arrangement being such that the said diverging ray is split into a plurality of further rays each having substantially the same characteristics as the rays already mentioned.

According to still another embodiment of the invention, a transmitter in the second position also projects a diverging ray which registers on a plurality of receivers in the first position. This diverging ray is also split into a plurality of further rays, each ray having substantially the same characteristics as the rays already mentioned. This combination of two transmitters projecting diverging rays from opposite sides of the court allows a rectangular area of the court, just outside the critical line, to be monitored.

In another embodiment of the invention, in addition to the effective cross-section of the ray being limited at the receiver, it is also limited at the transmitter, so that the ray can be directed to register on a specific receiver. This is done either by directing the scan of a ray away from all but one receiver, by modulation, or by apertures. Other methods may be employed. This feature of the invention is useful if an independent master ray (hereinafter described) is incorporated.

It is also useful if the invention is developed so that there are two or more transmitters in a first position aligned with the same number of receivers in a second position, the arrangement being such that the rays connecting the transmitters and receivers are substantially parallel to each other. Alternatively there are, in the first position, at least one transmitter and at least one receiver, and in a second position, at least one receiver and at least one transmitter, the transmitters and receivers being aligned so that the rays associated with them are substantially parallel to each other.

The embodiments summarized above are suitable for monitoring an area of a court on either one side or the other of the perpendicular to the critical line, depending on whether 'good' or 'fault' balls are to be monitored. If a ray is sited within the critical line, i.e. over the area in which the ball must bounce if it is a 'good' ball, the signal given is preferably silent. If a ray is sited outside the critical line, i.e. over the area in which the ball would bounce if it were a 'fault', the signal given is preferably audible although a silent signal such as a light may also be used. The effect is to monitor the area of the court adjacent to the ray because the ball will interrupt the reception of the ray by the receiver either on approaching the ground to bounce or on leaving the ground after bouncing.

It can occasionally happen that a 'good' ball can skid along the ground until it interrupts a further ray outside a critical line and thus give a false alarm. To cater for this eventually, a further embodiment incorporates a preventing device connected with said first ray which is then referred to as the master ray, which is provided in similar position to said first ray. The master ray is similar to the rays already described but it is an independent ray so that if it is interrupted by the passage of a ball, instead of actuating an alarm, it immediately prevents any alarm which would have been caused by the ball skidding through and interrupting any of the further rays which would normally actuate the 'fault' alarm. This effect is achieved, preferably, by electrically preventing any signal from the 'fault' rays from reaching the 'fault' alarm.

Another embodiment is particularly useful when the ball is travelling along approximately the same path as the rays which are to be interrupted as distinct from a path approximately at a right angle to the rays. For instance, if the rays are to monitor the center line on a tennis court, the ball is travelling in approximately the same path as the rays monitoring the center line whereas if the rays are to monitor the service line the ball is travelling at approximately a right angle to the service line. The effect is that because of the trajectory and path of the ball in the former case the rays must be closer together. The ray axes may be as close as is desired if the rays are projected in opposite directions, but this would mean that there would be both a transmitting and receiving means at the net which would be unnecessarily clumsy and would necessitate extra conductors in the center of the court. Further, when the ball is travelling in approximately the same path as the ray monitoring the center line, it should be noted that the height of the master ray is preferably positioned so that its axis is at about half the height of a tennis ball from the ground i.e. 1.25" to 1.5", the further rays being about the same height.

A further embodiment is based on the same principle but also incorporating a reverse ray principle. The device is used to simplify setting-up even when the rays are monitoring the service line and the ball is, therefore, travelling at approximately a right angle to the line being monitored. If setting up is done carelessly it is possible for two transmitters in a first position to register on one or more receivers in a second position, thus causing interference. However, an embodiment of the present invention overcomes this problem in that all receivers comprise means for detecting an effective part of the ray designed to register on a said receiver. An effective part of the said ray is the part of the said ray which registers on the said receiver and which causes the said receiver to generate a signal when the said ray is interrupted. The cross section of the effective part of all said rays throughout their useful length is limited so that the said cross section is substantially smaller in any dimension than the diameter of a standard tennis ball and so that the highest effective part of the said rays above the playing surface of the court is less than the height of a standard tennis ball in play making contact with the ground. The distance between any rays is such that a standard tennis ball in play striking the ground in the area monitored by the device must interrupt at least one of the rays.

All the rays are not necessarily at the same height. For instance, a said ray or a master ray monitoring a service or base line would be as low as practicable bearing in mind the accuracy of the court, but a said ray or a master ray monitoring a line at right angle to the net, for instance a side line or center line, would be at approximately half the height of a tennis ball. A further ray monitoring outside a service or base line would be as high as possible bearing in mind that a ball in play must not be able to strike the ground under it without interrupting the ray in passing but a further ray monitoring a critical line at a right angle to the net should preferably be at approximately half the height of a tennis ball, i.e. about the same height as the master ray or said ray at least when over its operative area.

As used herein, the words 'near' and 'far' referring to the further ray receivers designate the position of the said further rays registering on the said further receivers in relation to the appropriate service court and its position relative to the umpire's chair. The near further ray monitors a fault on the far service court and the far further ray monitors a fault on the near service court. The associated further ray receiver is sited adjacent the master ray receiver in the said second position, the said master ray receiver is between the near and far further ray receivers. Different characteristics are known by the symbols X and Y. As used herein, one example of the manner in which two rays can be said to have different characteristics is for the two rays to be of two different frequencies, i.e. one ray having a frequency X and another ray having a frequency Y. The term 'same service ball' or 'same ball' refers to one delivery, not the same ball during different deliveries.

As disclosed herein, one embodiment of an electrically operated device for monitoring an area near a critical line on a tennis court comprises first transmitting means; first receiving means; first signalling means; second receiving means; and second signalling means the first transmitting means is situated substantially in a first position, said first transmitting means comprising at least two transmitters for projecting at least two tennis ball monitoring rays; one of which is a said first ray being projected over a 'good' area of the court and one of which is a further ray being projected in substantially the same direction as the said first ray but over a fault area of the court; the said first ray being substantially parallel to and in practice slightly distanced from a perpendicular from the said critical line, said first ray being the nearest 'good' ball monitoring ray to said critical line and projected from the said first position, the said further ray also being projected from the said first position; the said first ray being so positioned that a ball in play falling across the court from the direction of the net and which strikes the said critical line must interrupt the said first ray. The first receiving means is situated substantially in said second position and comprises at least one receiver for receiving the said first ray projected by said first transmitting means.

The first signalling means is connected to said first receiving means for generating a 'good' signal when a standard tennis ball completely interrupts the reception of the effective part of said first ray at said first receiving means.

The second receiving means is situated in said second position for receiving at least one further tennis ball monitoring ray, said second receiving means comprising a receiver for receiving the at least one further tennis ball monitoring ray.

The second signalling means is connected to said second receiving means for providing an indication when a standard tennis ball completely interrupts the reception of the effective part of said further tennis ball monitoring ray at the said further ray receiver.

The projected characteristics of the said first ray are different from the projected characteristics of the said further ray, both rays being projected from transmitters in the said first position and the difference between the said characteristics being such that the said first ray, although registering on the said further ray receiver will not provide an indication of said registering on said further ray receiver and such that the said further ray, although registering on the said first ray receiver will not provide any indication of said registering on said first ray receiver.

In one form, to monitor the center line on a tennis court, the device comprises at least a master transmitter in a first position at the net projecting along the center line of the tennis court a master ray of characteristics X to a master ray receiver activated only by characteristics X in a second position at the back of the run-back area of the court. A near further ray transmitter is in the said first position for projecting a near further ray of characteristics across the far court and close to the center line to a near further ray receiver activated only by characteristics Y in the said second position. A far further ray transmitter is in the said first position for projecting a far further ray of characteristics Y across the near court and close to the center line to a far further ray receiver activated only by characteristics Y in the said second position. A signalling means indicates when the said master ray is substantially completely interrupted by a tennis ball, the said signalling means generates only a 'good' signal. A near further ray signalling means indicates when the said near further ray is interrupted by a tennis ball. A far further ray signalling means indicates when the said far further ray is interrupted by a tennis ball. Prevention means associated with the said master ray signalling means prevents any signal being caused by the interruption of any said further ray by a same ball which also interrupts the said master ray.

The switch means controls any signal caused by the interruption of any said ray. An indicator indicates the appropriate signal caused by the interruption of any said ray and allowed by the switch. A signal is generated by the interruption of the reception of the said near further ray by the said near further ray signalling means. A signal is generated by the interruption of the reception of the said far further ray by the said far further ray receiver if said signal is not prevented by said prevention means associated with said master ray signalling means. The switch means has a position during the service in which the said far court is the 'good' service court for allowing an indicator to indicate if the said master ray has been interrupted and for allowing a different indicator to indicate that only the said far further ray which monitors a fault when a 'good' service should strike in the 'far' court has been interrupted by the same service ball and preventing any signal indicating that the said near further ray which monitors a fault when a good service should strike in the near court has been interrupted. The switch means has a position during the service in which the said near court is the 'good' service court for allowing an indicator to indicate if the said master ray has been interrupted and for allowing a different indicator to indicate that only the said near further ray has been interrupted by the same service ball and preventing any signal indicating that the said far further ray has been interrupted. Preferably there is a repose position in the switch means which prevents any indicator indicating any signal caused by the interruption of any ray.

The interruption of the master ray prevents any signal caused by the interruption of any further ray by the same service ball. The said master ray projected by said master ray transmitter is projected with characteristics 'X' and received by said master ray receiver which is activated only by characteristics X. The said diverging ray projected by the said further ray transmitter is projected with characteristics 'Y' and received only by the said near further ray receiver and the said far further ray receiver, the said near further ray receiver and the said far further ray receiver being activated only by characteristics Y.

In another embodiment of the invention, to monitor, for instance, a service line, a master ray transmitter in a first position well outside the court, projects a master ray to a master ray receiver in a second position well outside the opposite side of the court. The master ray runs substantially parallel to the service line and, in practice, slightly distanced in from the perpendicular to the critical line which is the outside edge of the service line. The master ray is projected with characteristics X and the master ray receiver will only be activated by characteristics X.

A further ray transmitter in the second position projects a diverging ray of characteristics X which crosses the court just outside the service line and is received by three further ray receivers in the first position, these three further ray receivers will only be activated by characteristics X. Yet another further ray transmitter in the first position projects another diverging ray of characteristics Y which crosses the court progressively farther from the service line. This ray is received by three further ray receivers in the second position. These receivers will only be activated by characteristics Y. The effect of using a diverging ray being received by two or more receivers is to split the ray into three parts, each part of which monitors an additional area of the court. If the master ray is interrupted, because the master ray is a prevention ray, any signal which would have been caused by the interruption of any further ray by the same ball will be prevented. If a further ray is interrupted by a ball which does not interrupt the master ray, the interruption of the further ray will activate a fault signal.

If the receivers in the second position had all been activated by the same characteristics and the device had been carelessly set up so that the master ray transmitter had registered on the further ray receiver or vice versa, the interruption of a ray could have failed to cause a signal. With the present arrangement so long as the receivers are all activated, only correct signals can be given.

In one embodiment of the invention, the said first ray transmitter projects a first diverging ray which registers on a said first ray receiver and on at least one said further ray receiver, both the said first ray receiver and the said further ray receiver comprising means for detecting different characteristics in the said first diverging ray as projected thus splitting the said first ray into at least two parts one part becoming the said first ray part and the other part becoming the said further ray part. If the said first ray part is interrupted such interruption causes the generation of a 'good' signal and may be made to prevent any signal being given by the said further ray part; if the said further ray part is alone interrupted, such interruption causes the generation of f a 'fault' signal. If prevention means is provided, the said first ray part becomes a master ray.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
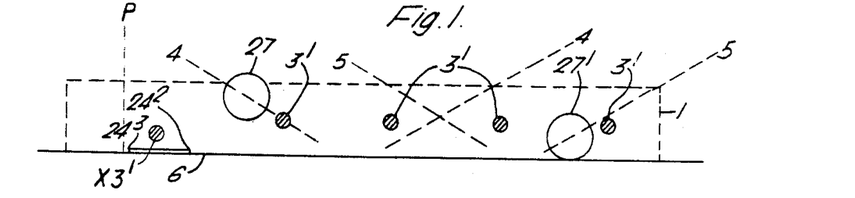
FIG. 1 is a diagrammatic view showing a cross-section of a typical arrangement of rays in relation to the surface of the court and the bounce of the ball.
Figure 3:
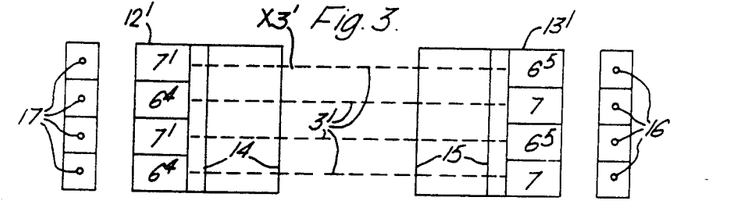
FIG. 3 is a diagrammatic front elevation with the associated plan view of the form of the invention shown in FIG. 1 on a smaller scale.
Figure 4:
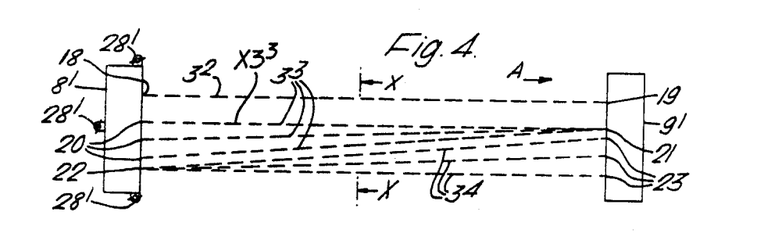
FIG. 4 is a diagrammatic plan view of the arrangement of the rays according to one embodiment of the invention.
Figure 5:
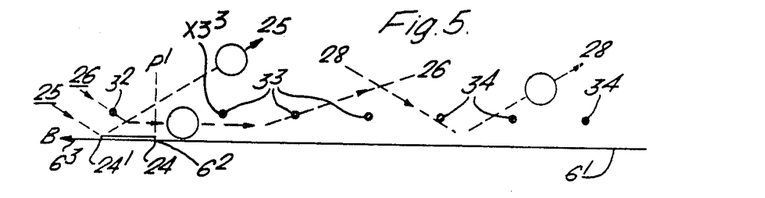
FIG. 5 is a diagrammatic view of the form of the invention shown in FIG. 4 showing on a larger scale a cross-section through the rays in relation to the surface of the court and a critical line.

In FIGS. 1 and 3 the prefix X identifies the ray nearest a perpendicular from a critical line. In FIGS. 4 and 5 the prefix X identifies the ray other than the master ray which is nearest a perpendicular from a critical line.

Referring now to FIG. 1, the outside of a typical box 1 housing one form of the invention is shown in relation to the cross-section of four infra red further rays $3^1$, a first ray $X3^1$, and a service line $24^2$–$24^3$ the outside edge $24^3$ being a critical line. The axes of the further rays are about 4.5 centimeters and that of the first ray $X3^1$ is about 2 centimeters above the play surface of the court and the highest effective part of the rays is less than the height of a typical tennis ball $27^1$ when it is making contact with the ground. The nearest of the rays $3^1$ to the perpendicular P from the critical line $24^3$ is about 15 centimeters from the perpendicular P and inside it, the first ray $X3^1$ is 5 centimeters from the perpendicular P, that is, the rays are over that part of the court in which the ball would bounce if it were 'good'. The dotted lines 4 and 5 represent the path of the center of balls 27 and $27^1$ striking the ground within the area monitored by the rays $3^1$. The ball 27 passes through a ray $3^1$ after striking the ground whilst the ball $27^1$ on path 5 passes through a ray as it approaches the ground. The cross-section of any of the rays is substantially smaller in any dimension than the diameter of typical tennis balls 27 and $27^1$. A ball $27^1$ passing across a ray interrupts the reception of the ray by its receiver even though the path 5 does not pass through the axis of a ray. The distance between the axes of any rays having their receivers in the same position is, at their receivers, greater than the diameter of a tennis ball and, in this instance, is illustrated as about 15 centimeters. When the passage of a ray is completely interrupted by a ball, the device gives a signal. This device would monitor an area of the court in which a ball would strike if it were 'good'.

Figure 2:
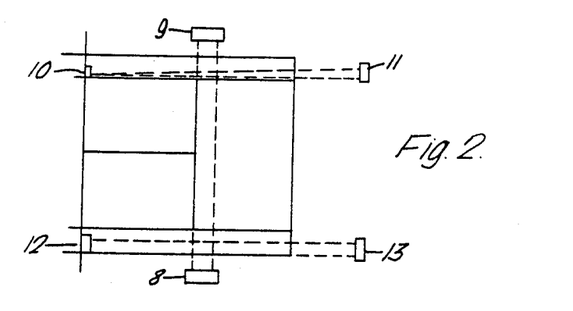
FIG. 2 is a diagrammatic view of one side of a tennis court showing some typical positions for various forms of the device.

Referring now to FIG. 2, this shows three forms of the invention in position to monitor various critical lines on a tennis court. Boxes 8 and 9 contain transmitters and receivers arranged in the currently preferred form of the invention. This device monitors, in this instance, the service line; further explanation will be given with reference to FIG. 5.

Boxes 12 and 13 contain transmitters and receivers which provide several parallel rays which, in this instance, monitor an area just inside a critical line of the doubles court. In this case, a signal would indicate that the ball was 'good'.

Referring now to FIG. 3, a box $12^1$ houses two transmitters $7^1$ and two receivers $6^4$; a box $13^1$ houses two receivers $6^5$ and two transmitters 7. Incorporated in box $12^1$ are two screens 14 spaced about 30 centimeters apart and in box $13^1$ are two screens 15 also about 30 centimeters apart. In the screens and aligned with their respective transmitters and receivers are small apertures 17 in box $12^1$ and similar apertures 16 in box $13^1$; the apertures about 1.5 centimeters in diameter. These apertures limit the spread of the rays $3^1$ at the transmitters and the cross-section of the rays $3^1$ at the receivers. This device corresponds with that shown at 12 and 13 on FIG. 2.

Referring now to FIG. 4, box $8^1$ houses a transmitter 18 which limits the ray $3^2$ which it projects so that it registers only on receiver 19 in box $9^1$. Box $8^1$ also houses three receivers 20 on which a diverging ray $3^3$ from transmitter 21 in box $9^1$ registers. Box $8^1$ also houses a transmitter 22 which projects a diverging ray $3^4$ which registers on the three receivers 23 housed in box $9^1$. The rays $3^3$ and $3^4$ are infra red rays which are coupled so that if the reception of any of them is interrupted, a signal is given. This signal will preferably be an alarm if the device is sited in relation to a critical line as will be indicated in the description for FIG. 5 and the ray $3^2$ has not been interrupted. The ray $3^2$ is a master ray and is independent of the rays $3^3$ and $3^4$ except that, if the reception of the master ray $3^2$ is substantially completely interrupted it immediately gives a signal which prevents any signal given by the rays $3^3$ and $3^4$ caused by the passage of the same ball. This may be done, for instance, by electrically stopping the supply to the alarm normally actuated by the interruption of any of the rays $3^3$ and $3^4$. Adjusting screws $28^1$ may be provided.

Referring now to FIG. 5, the playing surface of a court $6^1$–$6^2$–$6^3$ is shown in relation to a cross-section XX of the rays $3^2$, $3^3$, and $3^4$ shown in plan in FIG. 4 and a typical service line 24–$24^1$ the edge 24 of which is a critical line. The net is in the direction of the arrow B. The axes of the rays $3^3$ and $3^4$ are about 4.5 centimeters above the surface of the court, the axis of ray $3^2$ is about 2 centimeters above the surface of the court, and the highest part of any ray above the surface of the court is less than the height of a tennis ball making contact with the ground. The device is sited so that the first ray $3^2$ runs parallel to and adjacent to and slightly distanced in (about 8 centimeters) from the perpendicular $P^1$ from the critical line 24. The nearest of the further rays $3^3$ to the critical line 24 likewise runs parallel to and adjacent to the perpendicular $P^1$ from the critical line 24 but is about 15 centimeters outside the perpendicular $P^1$, that is, on the opposite side of the perpendicular $P^1$ to the master ray $3^2$. The other further rays $3^3$ and $3^4$ are spaced progressively from the perpendicular $P^1$. If a ball and its path 25 from a service strikes the ground between $6^3$ and $6^2$ and then interrupts the ray $3^2$, a light confirms that it is a 'good' ball. If a ball and its path 28 from a service strikes the ground between $6^2$ and $6^1$ it will interrupt at least one of the rays $3^3$ or $3^4$ thus actuating an alarm. If a ball and its path 26 from a service substantially completely interrupts the ray $3^2$ and then strikes the ground between $6^3$ and $6^2$ or strikes the critical line 24 and subsequently skids into the area $6^2$–$6^1$ interruptiing any of the rays $3^3$ or $3^4$ the prior interruption of the ray $3^2$ electrically prevents any supply from actuating any alarm and a light confirms that the ball was 'good'.

Figure 6A:
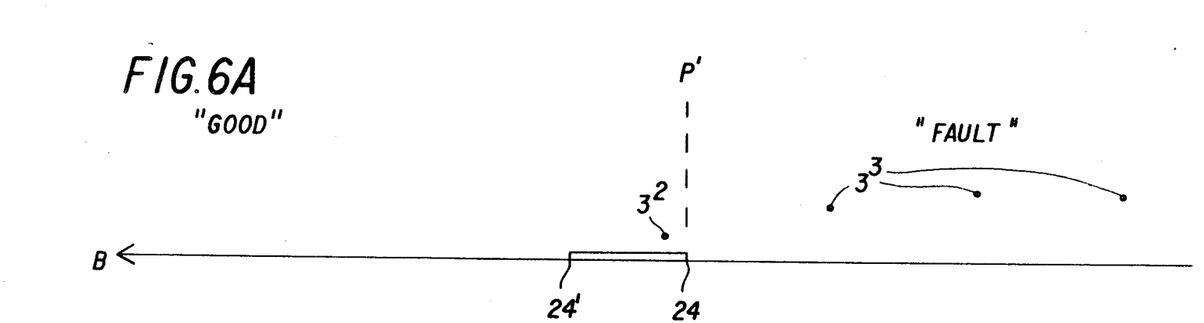
FIGS. 6A and 6B are diagrammatic views showing the cross-section of two alternate embodiments of ray arrangements.

The rays currently used are infra red or gallium arsenide based but any other rays which achieve similar results may be used. The reaction of a receiver to the interruption of its ray must be very fast and it is an advantage if a delay is incorporated so that although the signal is instantly actuated by the interruption of a ray, the signal itself is prolonged after the interruption of the ray has ceased. The transmitters are conveniently housed in weatherproof boxes which are designed and sited so that the axes of the further rays will preferably cross the playing surface of the court at a height of about 4.5 centimeters, the first or master ray is preferably lower. It is currently preferred that the greatest dimension of the effective cross-section of a typical ray be less than 1.5 centimeters. In the embodiments of FIGS. 1, 5 and 6A, for example, the axis of the nearest of the 'fault' or further rays to the perpendicular from the critical line being monitored is preferably sited about 15 centimeters outside the perpendicular. The further 'fault' rays are distanced progressively further from the critical line. The distance between the axes of any rays transmitted in the same direction and parallel to each other should not be less than the diameter of a tennis ball. If the rays diverge from the transmitter, the distance between the axes of neighboring rays at the receiver end should not be less than the diameter of a tennis ball. A distance of 15 centimeters separation has proven satisfactory in some embodiments. It is currently preferred that the axis of the master ray should be between 5 and 10 centimeters inside the perpendicular from the critical line being monitored. The authority governing the game will almost certainly lay down the position in the light of experience and the perfection or otherwise of the court being used.

Figure 6B:
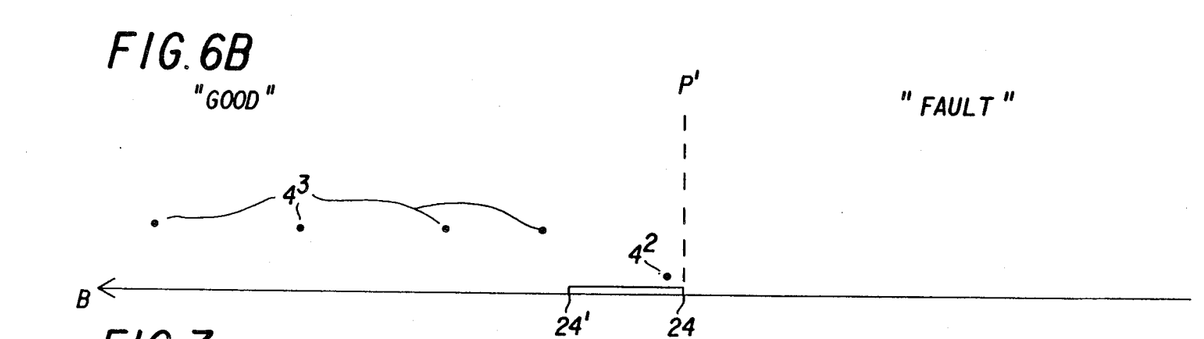

FIGS. 6A and 6B illustrate two embodiments of the invention with their respective rays shown in positional relationship. In both FIGS. 6A and 6B, $P^1$ represents the perpendicular from the critical line 24 and the arrow B indicates the direction of the net. Accordingly, the area of the court to the left of the perpendicular $P^1$ is the area of the court in which a 'good' ball would strike as it first approaches the court to bounce, while the area of the court to the right of the perpendicular is the area of the court in which a 'fault' ball would strike.

The embodiment of FIG. 6A is substantially the same as the embodiment of FIG. 5 discussed above. Ray $3^2$ and further rays $3^3$ of the FIG. 6A embodiment are positioned substantially identically as in FIG. 5. Ray $3^2$ of FIG. 6A, which functions as the master ray described above, is also known as "the first ray" for purposes of equating the position of ray $3^2$ with a ray $4^2$ of the embodiment of FIG. 6B.

As in the embodiment of FIG. 5, ray $3^2$ must be substantially completely interrupted in order for interruption thereof to prevent any subsequent signal occasioned by the interruption (be it partial or complete) of any of the rays $3^3$.

Figure 7:
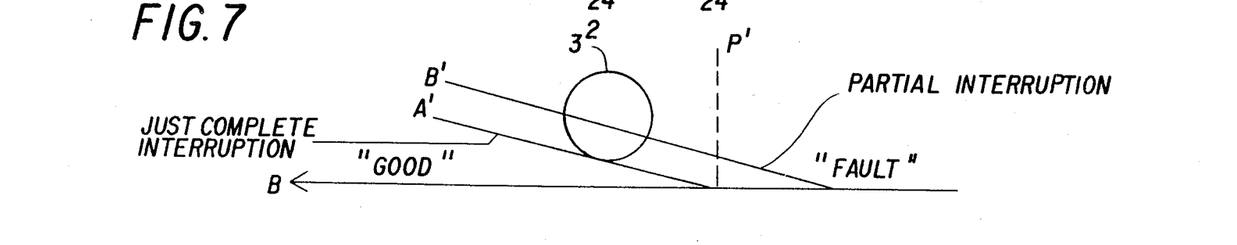
FIG. 7 is an enlarged view of the area around the ray $3^2$ in FIG. 6A.

The embodiment of FIG. 6B includes a first ray $4^2$ and a plurality of further rays $4^3$. The first ray $4^2$ is positioned substantially identically to the first ray $3^2$ of FIG. 6A: ray $4^2$ runs substantially parallel to the critical line 24 and is over an area of the court which a ball in play would strike if it were a 'good' ball; the ray $4^2$ is in practice slightly distanced from the perpendicular $P^1$ from the critical line 24 and is so positioned that a ball falling from over the 'good' area towards the critical line must, if it just completely interrupts the said ray $4^2$, strike the critical line 24. The line A' in FIG. 7 shows just complete interruption in respect of the ray $3^2$ for a ball falling from over the 'good' area.

The further rays $4^3$ of FIG. 6B travel over the 'good' area of the court at distances progressively farther from said critical line and are distanced apart from one another so that a ball in play striking the ground in the area monitored interrupts one of the further rays. Interruption (either partial or complete) of one of the further rays $4^3$ causes the generation of a signal indicative of the fact that the ball is 'good'. In this regard, if any rays are transmitted in the same direction and are parallel to each other the distance between these rays at their receivers should not be less than the diameter of a tennis ball. If the further rays $4^3$ were to be diverging rays (although not illustrated as such in FIG. 6B but easily understood in conjunction with FIG. 4), the distance between the axes of neighboring rays at the receiver end should not be less than the diameter of a tennis ball. Unlike ray $3^2$ of FIG. 6A, however, ray $4^2$ of FIG. 6B does not function as a master ray. In this respect, substantially complete interruption of ray $4^2$ indicates that the ball is 'good' and generates a signal accordingly.

It is to be noted that in none of the foregoing embodiments is an area of a tennis court adjacent a critical line monitored by an effective ball monitoring ray that passes directly over the critical line. In this regard, in each embodiment the nearest effective ball monitoring ray to the critical line is distanced from the perpendicular from the critical line. In FIG. 1, for example, the nearest effective ball monitoring ray to the perpendicular P to the critical line $24^2$ is the ray $X3^1$. In FIG. 6A the nearest effective ball monitoring ray to the perpendicular $P^1$ to the critical line 24 is the first ray $3^2$, which functions as a master ray. In FIG. 6B the nearest effective ball monitoring ray to the perpendicular $P^1$ to the critical line 24 is the first ray $4^2$, which does not function as a master ray. The term "effective ball monitoring ray" as used herein denotes a ray which is used to determine whether a ball is a 'good' ball or a 'fault' ball. According to the embodiments of the invention a first ray or master ray is not positioned directly over a critical line because it is not possible to make an absolutely flat court. The final decision on this point rests with the authority governing the game who may decide that the said first ray or master ray is the critical line.

The figures just given are currently considered suitable for monitoring the service line for which the device is primarily intended; if it were desired to monitor an area in which the ball was likely to fall more perpendicularly, the rays would be closer together. A device not required as the game progresses is suspended, for instance, by cutting off the supply to the audible 'fault' alarm after a 'good' service. The boxes housing the transmitters and receivers may be made adjustable to assist alignment of the rays. Reflectors may be incorporated to change the direction of the rays so that, for instance, the rays are projected from and received on the same side of the court. The siting of the rays, particularly the 'fault' ray nearest to its critical line and an associated master ray, is very important. If the 'fault' ray nearest to its critical line is too far from the perpendicular from that critical line, a ball could strike the ground outside the critical line and then bounce over the nearest 'fault' ray, thus giving no alarm. If the master ray is too far in from the perpendicular from its critical line, a ball could pass over the master ray without interrupting it, then strike the critical line and, after bouncing, interrupt a 'fault' ray and thus actuate an alarm without cause.

Referring now to FIG. 7, this is an enlarged view of the area around the ray $3^2$ in FIG. 6A, to show the definite dividing line caused by complete interruption. If the ball falls lower than the line $A^1$ the ball must be 'good'. If the ball falls with the bottom of the ball just completely interrupting the effective area of ray $3^2$ along the line $A^1$ the ball just strikes the critical line and a 'good' signal is given. If ray $3^2$ is a master ray, any further signals are prevented. With partial interruption, for instance, the bottom of the ball falling along the line $B^1$ the ball is a 'fault'. Ray $3^2$ gives no signal and the further or 'fault' rays give a 'fault' signal. The ray $3^2$ is not directly on the critical line because in practice the court is never exactly flat.

Figure 8:
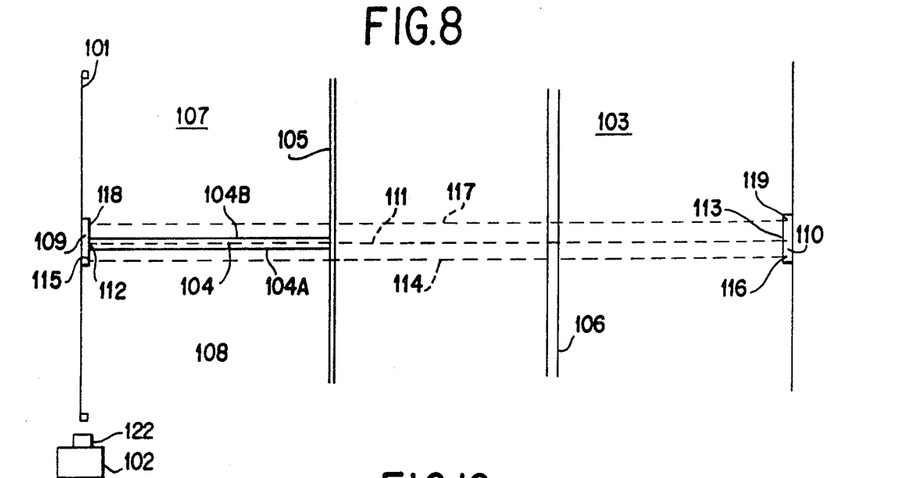
FIG. 8 is a diagrammatic plan view of a half tennis court showing a form of the invention suitable for monitoring a center line on a tennis court.

FIG. 8 represents a plan view of a half tennis court on which is shown a net 101; umpire's chair 102; run back area 103; a center line 104; part of the service line 105; part of base line 106; part of a far service court 107; part of a near service court 108; a said first position 109; and a said second position 110. Associated with the said first position 109 is a master ray 111 of characteristics X projected from master ray transmitter 112 in the said first position 109 and received by master ray receiver 113 in the said second position 110; far further ray 114 of characteristics Y projected from far further ray transmitter 115 in first position 109 and received by far further ray receiver 116 in said second position 110; near further ray 117 of characteristics Y projected from near further ray transmitter 118 in the said first position 109 and received by near further ray receiver 119 in said second position 110. As used herein, one example of the manner in which two rays can be said to have different characteristics is for the two rays to be of two different frequencies, i.e. one ray having a frequency X and another ray having a frequency Y.

When the far service court 107 is the court in which a 'good' service should strike, the center line 104 is part of that court and the edge 104A of the center line 104 which is adjacent the near service court 108 is the critical line being monitored by the device. In this case the far further ray 114 is at least partially and in this case wholly projected over the near court 108; if the ball strikes in this court without striking any part of the far court 107 including any part of the center line the ball is a fault. If, in striking near court 108 the ball also completely interrupts far further ray 114 without interrupting master ray 111 the interruption of the reception of the far further ray 114 on the far further ray receiver 116 will generate a signal activating a sound device to indicate that the ball is a fault. The switch 122, placed, for instance on the umpire's chair and operated by the umpire will have been pushed by the umpire into the 'far court' position and will allow the signal to reach the light or sound device in use.

If, however, the far further ray 114 and the master ray 111 had both been completely interrupted, the interruption of the master ray 111 would have electrically prevented any signal caused by the interruption of far further ray 114. It could be that far further ray 114 was, at the same time registering on master receiver 113 but because further ray 114 operates on characteristics Y and master ray 111 operates on characteristics X, such registering will have no effect. It could also happen that the ball, instead of interrupting far further ray 114 had instead interrupted only near further ray 117. In this case the ball would be 'good' but, when the umpire pushed the switch 122 into the 'far court' position the movement of the switch would have made an electrical connection to allow a desired signal caused by the interruption of far further ray 114 to reach the light or sound device but, at the same time the same movement would prevent for instance, by mechanical means, e.g. breaking the connection, any signal caused by the interruption of near further ray 117.

When the near service court 108 is the court in which a 'good' service should strike, the center line 104 is part of that court and the edge 104B of the center line 104 which is adjacent the far service court 107 is the critical line being monitored by the device. In this case the near further ray 117 is at least partially and, in this case, wholly projected over the far court 107; if the ball strikes in this court without striking any part of the near court 108 including any part of the center line, the ball is a fault. If, in striking far court 107 the ball also completely interrupts near further ray 117 without interrupting master ray 111, the interruption of the reception of the near further ray 117 on the near further ray receiver 119 will generate a signal activating a sound device to indicate that the ball is a fault. The switch 122 will, before the service commences, have been pushed by the umpire into the 'near court' position and will allow the signal to reach the light and sound device in use. It will be understood that it is a convention in tennis that only 'faults' are called so that the present invention uses a sound device for faults.

If, however, the near further ray 117 and the master ray 111 had been completely interrupted, the interruption of the master ray 111 would have electrically prevented any signal caused by the interruption 111 of the near further ray 117. If desired, the interruption of master ray 111 will also cause a 'good' signal, e.g. a light. It could be that near further ray 117, at the same time as registering on near further receiver 119 was also registering on master receiver 113 but because near further ray 117 operates on characteristics Y and master ray 111 operates on characteristics X, such registering on master receiver 113 will have no effect. It could also happen that the ball, instead of interrupting near further ray 117 had instead interrupted only far further ray 114. In this case the ball would be 'good' and well within the 'good' court but, when the umpire had pushed the switch 22 into the 'near court' position the movement of the switch would have made an electrical connection to allow a desired signal caused by the interruption of the near further ray 117 to reach the light or sound signalling device but, at the same time, the same movement would prevent, for instance by breaking the connection, any signal caused by the interruption of the far further ray 114.

Figures 9, 10:
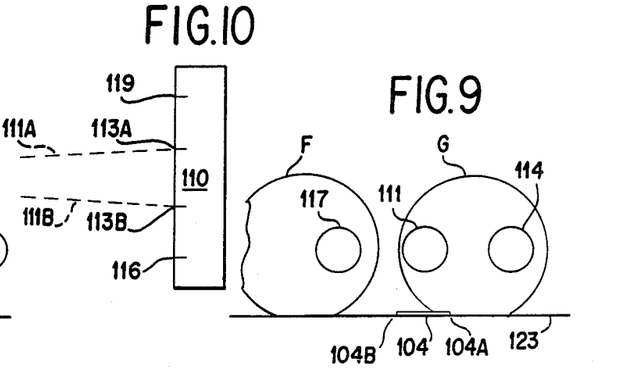
FIG. 9 shows a diagrammatic cross-section showing the position of the rays relative to the center line in FIG. 8 with the ball superimposed.
FIG. 10 is a partial view showing twin master ray receivers substituting for the single master ray receiver in FIG. 8.

FIG. 9 shows a diagrammatic cross section showing the position of the rays relative to the center line in FIG. 1 with the ball superimposed. The line 123 represents the playing surface of the court. FIG. 9 also shows the center line 104 with its two edges 104A and 104B; the master ray 111 of characteristics X, the far further ray 114 of characteristics Y and the near further ray 117 also of frequency Y. Because the ball is travelling along approximately the same path as the rays which are to be interrupted, the rays must be substantially closer than the diameter of a tennis ball, otherwise it would be possible for a ball to strike within the area monitored by the device without interrupting at least one of the rays. A standard tennis ball 120 to which this specification applies, is about 2 ½ inches in diameter and, assuming the effective area of the rays to be ½ inch diameter in cross-section, the distance between the axes of the master ray and the further rays is, in this instance, just under 2 inches. The height of the axes of all the rays above the court surface is about 1.125 inches - this allows for a slight flattening of the ball when it strikes the court.

According to the rules of tennis, the center line from its edge 104B to its edge 104A is 2 inches wide; a ball G which just interrupts the master ray 111 on the center line of the court will, therefore, clearly strike the outside edge 104A of the center line 104 which, if the near court 108 (FIG. 8) were the 'good' court, the edge 104A would be the critical line and the ball G would be good. Although the ball G had also interrupted the near further ray 117 no fault signal would be given. If, however, the ball F had interrupted the near further ray 117 without interrupting the master ray 111, the ball F would not strike the edge of the critical line 104A and the ball G would be a fault. A fault signal would be given because the master ray 111 bad not been interrupted.

The tennis authorities may decide that when the ball G flattened on striking the ground less tolerance should be allowed to the server, in which case the master ray 111 would diverge and would be received on twin master ray receivers 113A and 113D shown on FIG. 10 which is a partial view of the pertinent part of FIG. 8.

Figure 11:
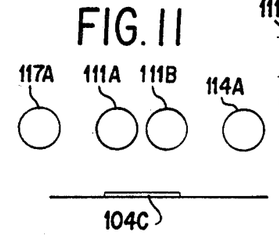
FIG. 11 is a diagrammatic cross section showing the effect of making the master ray into a diverging ray.

FIG. 11 shows a diagrammatic cross section of a diverging ray which is registering on receivers 113A and 113B. The effect is to give the effect of monitoring a slightly wider center line 104C. The master ray 111 is now split into two parts, 111A and 111B. Both parts will act as a master ray. Further rays 114A and 117A can now be farther apart.

Figure 12:
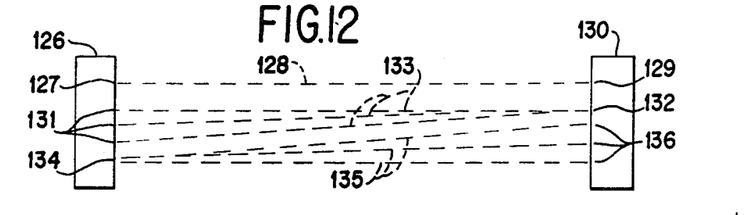
FIG. 12 is a diagrammatic plan view showing the arrangement of the rays in a different form of the invention, said further diverging rays being on the same side of the master ray.

Referring now to FIG. 12, a box 126 in a first position houses a transmitter 127 which projects a ray 128 of characteristics X which registers on receiver 129 in box 130 in a second position. Box 130 also houses transmitter 132 which projects a further ray, a diverging ray 133 of characteristics X from the said second position to register on three receivers 131 in box 126 in the said first position. As ray 128 and ray 133 are projected in opposite directions, the transmitter of ray 128 being in the first position and the receivers of ray 133 being in the same first position, no interference in the reception of the rays is possible. Box 126 in the said first position also houses a transmitter 134 which projects a further ray, also a diverging ray 135 of characteristics Y which registers on three receivers 136, housed in box 130 in the second position. The receivers 136, being in the same said second position as receiver 129, and ray 128 being projected in the same direction as ray 133, because ray 128 is of characteristics X which has no effect on the receivers 136 of ray 135 which are activated by characteristics Y and, similarly, ray 135 can have no effect on receiver 129, ray 135 being of characteristics Y and receiver 129 only being activated by characteristics X.

The arrangement just described and shown in FIG. 12, is, if ray 128 is a said first or master ray, suitable for monitoring the service line and the area just outside it. In this case, ray 128 will be a 'prevention' ray and, if it is interrupted, will prevent any signal being caused by the interruption further ray, i.e. the fault rays 133 and 135. If the device is monitoring a critical line and the area inside it, the ray 128 will be a said first ray and the further rays will be projected over a 'good' area of the court.

If a critical line parallel to the net is being monitored the master ray or the said first ray is so positioned that a standard tennis ball in play falling across the area of the court in which it would strike if it were a 'good' ball and falling towards the said critical line, and which just completely interrupts the effective part of the said first ray, must afterwards strike the critical line.

Figure 13:
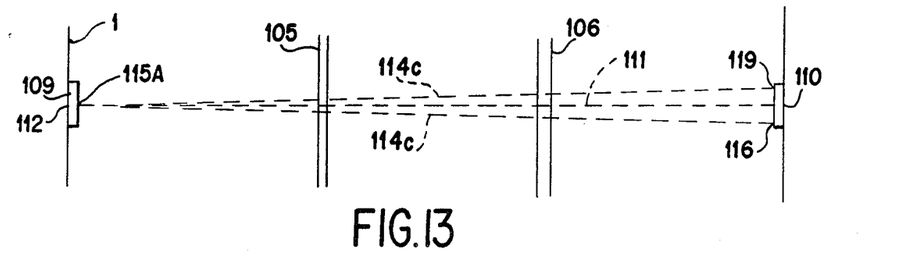
FIG. 13 is a diagrammatic plan view showing the arrangement of the rays when a further ray diverges onto further ray receivers sited on each side of the said master ray receiver.

FIG. 13 shows another form of the device shown in FIG. 8, but instead of there being two separate further ray transmitters projecting further rays 114 and 117 there is a single further ray transmitter 115A sited directly above master ray transmitter 112 in the said first position; said further ray 114C is a diverging ray which is split into two parts as it registers on near further ray receiver 119 and far further ray receiver 116. It will be remembered that services in first class tennis usually fall on the outer end of the center service line.

Figures 14A, 14B:
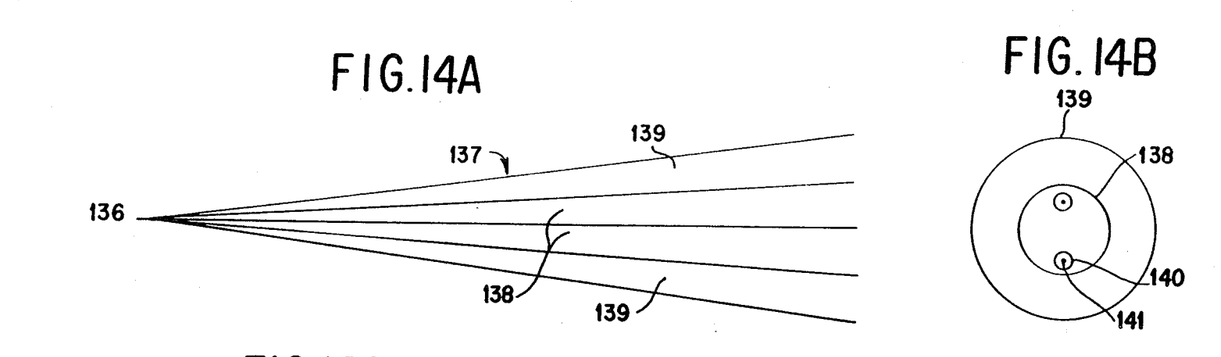
FIGS. 14A and 14B are side and end views, respectively, showing the effective and ineffective areas of a diverging ray.

Referring now to FIG. 14, a transmitter 136 projects a diverging ray 137 which is made up on an outer ineffective area 139 and an inner effective area 138 which registers on two receivers 141 and 141X with their lenses 140 and 140X. The distance between the transmitter 136 and the receivers 141 is of the order of 70 feet (about 21 meters) so the drawing is not to scale.

Figures 15A, 15B:
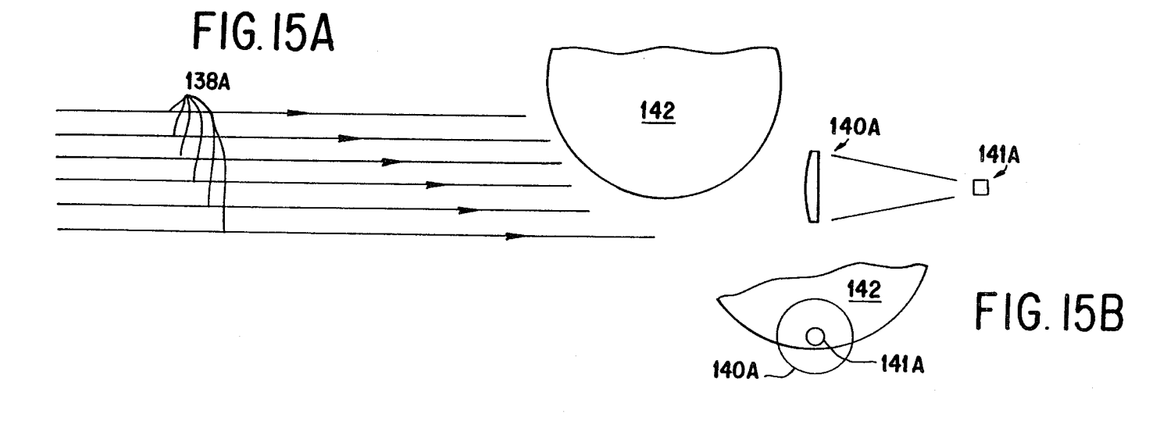
FIGS. 15A and 15B are side and partial end views, respectively, showing substantially complete interruption of the effective part of a ray on a receiver.

Referring now to FIG. 15, the receiving end of the ray 138 is, at the distance, substantially parallel. The receiver 141A and its lens 140A are approximately full size. The ball 142 is substantially completely interrupting the direct passage of the rays on to the receiver, as distinct from partial interruption which would be much less definite.

While the invention has been particularly shown and described with reference to the preferred embodiments thereof, it will be understood by those skilled in the art that various alterations in form and detail may be made therein without departing from the spirit and scope of the invention, for instance, when the device is monitoring critical lines at right angles to the net the device is more accurate if the said first ray is so positioned that a ball in play falling across the court from the direction of the net and which strikes the said critical line must also substantially completely interrupt the said first ray. The receiver is activated when the effective part of the ray is substantially completely interrupted.

Referring to FIG. 8, the arrangement already described applies to the use of rays having different characteristics. If it is desired to use rays having the same characteristics the direction of projection of the said master ray 111 would be reversed so that the said first position for only the said master ray 111 would be at 110 and the said second position would be at 109. The master ray transmitter would be at 110 and the said master ray receiver would be at 109. No interference would then be possible but the arrangements at the net would not be so neat. The operation of the device will readily be understood from the description already given for FIG. 8.

The embodiments of the invention in which an exclusive property or privilege is claimed are defined as follows:

1. An electrically operated device to monitor the area near a critical line on a tennis court, said device including at least one transmitting means comprising a first transmitter in a first position, at least a first receiver in a second position, a further transmitter, a further receiver, and at least one signalling means controlled by the said first receiver, the said first transmitter projecting a first ray, the effective part of which registers on the said first receiver, the said first ray running substantially parallel to the said critical line and running over an area of the court on which a standard tennis ball in play would strike if it were a "good" ball, the said first receiver comprising means for defining the effective part of the said first ray, said effective part of said first ray being the part of said first ray which registers on said first receiver, the cross section of the effective part of the said first ray throughout its useful length being limited so that the first cross section is substantially smaller in any dimension than the diameter of a standard tennis ball, and so that the highest effective part of the said first ray above the playing surface of the court is less than the height of a standard tennis ball in play making contact with the ground, the said further transmitter projecting a further ray which registers on said further receiver and which is the closest ball monitoring ray to said first ray, said device being characterized in that:

(1) the said signalling means generates a "good" signal only on the substantially complete interruption of the effective part of the said first ray registering on the receiver;

(2) the said first ray is so positioned that a standard tennis ball in play falling across the said area of the court in which it would strike if it were a "good" ball and falling towards the said critical line and which just completely interrupts the said effective part of the said first ray, must afterwards strike the said critical line; and, (3) the receiver of said further ray is situated in a manner whereby the further ray is transmitted in a direction which is the opposite of a direction from said first position to said second position.

2. The apparatus of claim 1 wherein said transmitting means for transmitting said further ray projects a first diverging ray which registers on a plurality of receivers in the opposite position, each of said receivers having limiting means such that said first diverging ray is split by its receivers into said plurality of said further rays.

3. The apparatus of claim 2 further comprising transmitting means in a position opposite the position of the means transmitting said first diverging ray for projecting a second diverging ray which registers on a plurality of further receivers in said position of said means transmitting said first diverging ray, each of said second diverging ray receivers having limiting means such that said second diverging ray is split by said second diverging ray receivers into a plurality of further rays, said further rays comprising said second diverging ray and being projected in a direction opposite to the direction of the further rays comprising said first diverging ray.

4. A device as in claim 1 to monitor the area near the centre line on a tennis court and in which the said first ray is a master ray, the device comprising:
- a master transmitter at a first position at the net projecting along the centre of the tennis court centre line a master ray to a master ray receiver in a second position at the back of the run-back area of the tennis court;
- a near further ray transmitter in the said second position projecting a near further ray in a direction opposite to the direction of the said master ray to a near further ray receiver in the said first position;
- a far further ray transmitter in the said second position projecting a far further ray in a direction opposite to the direction of the said master ray to a far further ray receiver in the said first position;
- signalling means to indicate when the said master ray is substantially completely interrupted by a tennis ball, the said signalling means generates only a 'good' signal and a near further ray signalling means to indicate when the said near further ray is interrupted by a tennis ball;
- a far further ray signalling means to indicate when the said far further ray is interrupted by a tennis ball;
- a prevention means associated with the said master ray signalling means to prevent any signal being caused by the interruption of any said further ray by a same ball which also interrupts the said master ray;
- switch means to designate whether said near further ray or said far further ray is to be effectively utilized;
- indicator means to indicate the appropriate signal caused by the interruption of said ray designated by said switching means.

5. An electrically operated device for monitoring an area near a critical line on a tennis court, said device comprising:
- transmitting means situated substantially in a first position, said first transmitting means comprising at least one transmitter for projecting at least one tennis ball monitoring first ray to a second position, said first ray being over a "good" area of the court and running essentially parallel to and in practice slightly distanced from a perpendicular from said critical line as said first ray travels from said first position to said second position, said first ray being the nearest effective "good" ball monitoring ray to said perpendicular from said critical line, said first ray being so positioned that a standard tennis ball in play falling across the said "good" area towards the said critical line and which just completely interrupts the reception of the effective part of the said first ray must afterwards strike the said critical line;
- first receiving means situated substantially in said second position, said first receiving means comprising at least one receiver for receiving the ray projected by said first transmitting means, said receiver comprising means for defining the effective part of the said first ray, the effective part of said first ray being the part of said ray which registers on said receiver, the cross-section of the effective part of the said first ray throughout its useful length being limited so that the said cross-section is substantially smaller in any dimension than the diameter of a standard tennis ball, and so that the highest effective part of the said first ray above the playing surface of the court is less than the height of a standard tennis ball in play making contact with the ground;
- first signalling means connected to said first receiving means for generating a "good" signal when a standard tennis ball substantially completely interrupts the reception of the effective part of said first ray at said first receiving means;
- second transmitting means situated in a position for transmitting at least one further tennis ball monitoring ray which is the closest said further tennis ball monitoring ray to the said first ray;
- second receiving means situated in a position opposite said second transmitting means for receiving said at least one further tennis ball monitoring ray, said second receiving means comprising a receiver for said at least one further tennis ball monitoring ray, said further ray receiver being situated in a manner whereby the further ray is transmitted in a direction which is the opposite of a direction from said first position to said second position; and
- second signalling means connected to said second receiving means for providing an indication when a standard tennis ball completely interrupts the reception of the effective part of said further tennis ball monitoring ray at the further ray receiver.

6. The device of claim 5 wherein said second transmitting means projects a diverging ray, said diverging ray being split into a plurality of rays by a plurality of receivers comprising said second receiving means, each ray of said pluraltiy of rays split so as to have an effective cross-section throughout its useful length substantially smaller in any direction than the diameter of a standard tennis ball.

7. The device of claim 6 further comprising:
- third transmitting means situated in a position opposite said second transmitting means, said third transmitting means comprising at least one transmitter for projecting a second diverging ray substantially toward the position of said second transmitting means, the highest effective part of said diverging ray above said tennis court being less than the height of a standard tennis ball in play making contact with said tennis court;
- third receiving means situated in a position opposite said third transmitting means, said third receiving means comprising a plurality of receivers for splitting said second diverging ray into a plurality of rays and for receiving said plurality of rays, each ray of said plurality of rays having an effective cross-section throughout its useful length smaller in any direction than the diameter of a standard tennis ball, said third receiving means being connected to said second signalling means to provide an indication that a tennis ball has interrupted the reception of any of said plurality of rays at said third receiving means.

8. A device as in claim 5 in which any said further ray is over an area of the court in which a ball in play must strike if it is a 'good' ball and the said distance from the said first ray being such that a ball in play will interrupt the passage of at least one ray in the area monitored by the device.

9. An electrically operated device for monitoring an area near a critical line on a tennis court, said device comprising:

first transmitting means situated substantially in a first position, said first transmitting means comprising at least two transmitters for projecting at least two tennis ball monitoring rays; one ray of which is a first ray being projected over a 'good' area of the court and one ray of which is a further ray being projected in substantially the same direction as the said first ray; the said first ray being substantially parallel to and, in practice, slightly distanced from a perpendicular from the said critical line; said first ray being the nearest 'good' ball monitoring ray to the said critical line and projected from the said first position; the said further ray also being projected from the said first position;

the said first ray being so positioned that a ball in play falling across the court from the direction of the net and which strikes the said critical line must interrupt the said first ray; and the distance between any rays is such that a standard tennis ball in play striking the ground in the area monitored by the device must interrupt at least one of the rays;

the cross-section of the effective part of all said rays throughout their useful length being limited so that the said cross-section is substantially smaller in any dimension than the diameter of a standard tennis ball and so that the highest effective part of the said rays above the playing surface of the court is less than the height of a standard tennis ball in play making contact with the court;

first receiving means situated substantially in a second position, said first receiving means comprising at least one receiver for receiving the said first ray projected by said first transmitting means; and first signalling means connected to said first receiving means for generating a 'good' signal when a standard tennis ball substantially completely interrupts the reception of the effective part of said first ray at said first receiving means;

second receiving means situated in said second position for receiving at least one further tennis ball monitoring ray, said second receiving means comprising a receiver for receiving the at least one further tennis ball monitoring ray second signalling means connected to said second receiving means for providing an indication when a standard tennis ray ball completely interrupts the reception of the effective part of said further tennis ball monitoring ray at the said further ray receiver; and the projected characteristics of the said first ray being different from the projected characteristics of the said further ray, both rays being projected from transmitters in the said first position and the difference between the said characteristics being such that the said first ray, although registering on the said further ray receiver will not provide any indication of said registering on said further ray receiver and such that the said further ray, although registering on the said first ray receiver will not provide any indication of said registering on said first ray receiver.

10. A device as in claim 9 to monitor the center line on a tennis court, and in which the said first ray is a master ray, the device comprising:

a master transmitter at a first position at the net projecting along the center of the tennis court center line a master ray of characteristics X to a master ray receiver activated only by characteristics X in a second position at the back of the run-back area of the tennis court;

a near further ray transmitter in the said first position projecting a near further ray of characteristics Y to a near further ray receiver activated only by characteristics Y in the said second position;

a far further ray transmitter in the said first position projecting a far further ray of characteristics Y to a far further ray receiver activated only by characteristics Y in the said second position;

signally means to indicate when the said master ray is substantially completely interrupted by a tennis ball, the said signalling means generates only a ,good, signal and a near further ray signalling means to indicate when the said near further ray is interrupted by a tennis ball;

a far further ray signalling means to indicate when the said far further ray is interrupted by a tennis ball;

a prevention means associated with the said master ray signalling means to prevent any signal being caused by the interruption of any said further ray by a same ball which also interrupts the said mater ray;

switch means to designate whether said near further ray or said far further ray is to be effectively utilized;

indicator means to indicate the appropriate signal caused by the interruption of said ray designated by said switching means.

11. A device as in claim 9 in which the said further ray projected from the said first position is a diverging ray registering on at least two said further ray receivers, and wherein the projected characteristics of said further ray is different from the projected characteristics of the said first ray and the said further ray receivers not providing any indication of the registering of said first ray.

12. A device as in claim 11 and in which the said further ray diverges onto at least two said further ray receivers, there being at least one further ray receiver sited on each side of said master ray receiver, all said receivers being in the said second position.

13. A device as in claim 9 and in which the said further ray diverges onto at least two said further ray receivers, there being at least one further ray receiver sited on each side of said master ray receiver, all said receivers being in the said second position.

* * * * *